(12) United States Patent
Moser et al.

(10) Patent No.: US 10,040,633 B2
(45) Date of Patent: Aug. 7, 2018

(54) BELT-DRIVEN ROLLER CONVEYOR

(71) Applicant: Intelligrated Headquarters, LLC, Mason, OH (US)

(72) Inventors: Michael E. Moser, Hamilton, OH (US); Kevin Lawrence Klueber, Indian Springs, OH (US); Jonathan Lim, Milford, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 15/333,854

(22) Filed: Oct. 25, 2016

(65) Prior Publication Data

US 2017/0121117 A1     May 4, 2017

Related U.S. Application Data

(60) Provisional application No. 62/371,523, filed on Aug. 5, 2016, provisional application No. 62/250,765, filed on Nov. 4, 2015.

(51) Int. Cl.
    *B65G 13/07*      (2006.01)
    *B65G 23/14*      (2006.01)

(52) U.S. Cl.
    CPC ............. *B65G 13/07* (2013.01); *B65G 23/14* (2013.01)

(58) Field of Classification Search
    CPC ................................. B65G 23/14; B65G 13/07
(Continued)

(56) References Cited

U.S. PATENT DOCUMENTS 3,323,636 A * 6/1967 Gotham ............... B65G 47/261
                                                                                       198/790
4,096,942 A * 6/1978 Shepherd ............. B65G 47/261
                                                                                      198/781.06

(Continued)

FOREIGN PATENT DOCUMENTS

DE           202 07 498 U1     9/2003
DE    20 2004 019963 U1     4/2006

(Continued)

OTHER PUBLICATIONS

International Search Report and Written Opinion for International Application No. PCT/US2017/045425 dated Jan. 25, 2018.

*Primary Examiner* — Mark A Deuble

(74) *Attorney, Agent, or Firm* — Alston & Bird LLP

(57) ABSTRACT

A conveyor section for transportation or accumulation of articles such as cartons and totes includes a pair of spaced, opposing side rails, vertical frame members attached transversely between the pair of opposing side rails, and live rollers transversely attached for rotation between the opposing side. An upstream end idler and a downstream end idler both having a vertical axis of rotation are attached at respective upstream and downstream ends of the conveyor section. A drive belt is vertically elongate and supported for horizontal looping between the upstream and downstream end idlers. The drive belt supported and guided by the vertical frame members such that a drive loop side and a return loop side are horizontally positioned under the live rollers. The drive loop side of the drive belt is at selectively engageable to an undersurface of the live rollers. A drive motor is operatively coupled to drive the drive belt.

15 Claims, 15 Drawing Sheets

(58) Field of Classification Search
USPC .................................................. 198/790, 833
See application file for complete search history.

(56) References Cited

U.S. PATENT DOCUMENTS

| | | | | | |
|---|---|---|---|---|---|
| 4,485,913 | A | * | 12/1984 | Treiber | B65G 13/07 198/790 |
| 4,588,073 | A | * | 5/1986 | Abell | B65G 47/263 198/781.06 |
| 4,609,099 | A | * | 9/1986 | Pentith | B65G 15/04 198/833 |
| 4,753,339 | A | | 6/1988 | Vogt | |
| 5,176,246 | A | * | 1/1993 | Wiggers | B65G 13/07 198/789 |
| 5,984,082 | A | * | 11/1999 | Geib | B65G 13/07 198/781.11 |
| 6,612,423 | B1 | * | 9/2003 | Silverman | B65G 13/07 198/781.03 |
| 8,910,774 | B2 | * | 12/2014 | Hundegger | B23Q 7/03 198/626.5 |
| 2003/0213679 | A1 | * | 11/2003 | Warnecke | B65G 13/08 198/790 |

FOREIGN PATENT DOCUMENTS

| | | | |
|---|---|---|---|
| EP | 1161388 A2 | 12/2001 | |
| EP | 1710176 A2 * | 10/2006 | ............. B65G 21/06 |
| JP | 2002-019933 A | 1/2002 | |
| WO | WO 00/40485 A2 | 7/2000 | |

* cited by examiner

BELT-DRIVEN ROLLER CONVEYOR

CLAIM OF PRIORITY UNDER 35 U.S.C. § 119

The present application for patent claims priority to two U.S. Provisional Patent Application Ser. Nos. (i) 62/250,765 filed on 4 Nov. 2015, and (ii) 62/371,523 filed on 05 Aug. 2016, both entitled "Belt-Driven Roller Conveyor" and both assigned to the assignee hereof, the disclosures of which are hereby expressly incorporated by reference in their entirety.

FIELD OF THE INVENTION

The present disclosure generally relates to material handling systems, and more particularly to transport and accumulation conveyors that support articles on rollers driven by a padded chain or linear belt.

BACKGROUND

Powered roller conveyor systems are used in the material handling system to convey articles such as products in totes or cartons through a material handling system. A drive belt or chain can be used to turn rollers that provide the support surface for the articles. One generally-known accumulation and transportation conveyor uses a drive belt that longitudinally underlies the roller that are oriented transverse to the longitudinal axis of the conveyor. This generally-known belt-drive roller conveyor has an elongate transverse cross section with a thin vertical cross section. Thus, the section of conveyor served by such a particular belt is necessarily straight or nearly straight. At each end of the section, the upper portion of the belt by a pulley having a horizontal, transverse axis guiding the remainder of a belt loop beneath the portion that drives the rollers. The belt can have advantages of being relatively quiet as compared to chains.

Another generally-known powered roller conveyor incorporates a drive chain that is topped by a drive pad that contacts the undersurface of the live rollers. This chain-driven pad is relatively narrow in horizontal cross section as installed down a longitudinal axis of the conveyor. Being narrow, the chain-driven pad can be horizontally turned at each end of a section of conveyor. This horizontal return loop enables curving the section of conveyor to the right or left as required rather than having to be essentially straight. Although providing design flexibility, the drive chain can create more noise than a belt implementation.

BRIEF DESCRIPTION OF DRAWINGS

The accompanying drawings, which are incorporated herein and constitute part of this specification, illustrate exemplary embodiments of the invention, and together with the general description given above and the detailed description given below, serve to explain the features of the invention.

FIG. 18 illustrates a graphical plot of test results for tracking location of the transfer belt installed on the INTELLIQ accumulation conveyor annotated with changes in

DETAILED DESCRIPTION

A conveyor section for transportation or accumulation of articles such as cartons and totes includes a pair of spaced, opposing side rails, vertical frame members attached transversely between the pair of opposing side rails, and live rollers transversely attached for rotation between the opposing side. An upstream end idler pulley and a downstream end idler pulley both having a vertical axis of rotation are attached at respective upstream and downstream ends of the conveyor section. A drive belt is vertically elongate and supported for horizontal looping between the upstream and downstream end idler pulleys. The drive belt supported and guided by the vertical frame members such that a drive loop side and a return loop side are horizontally positioned under the live rollers. The drive loop side of the drive belt is at selectively engageable to an undersurface of the live rollers. A drive motor is operatively coupled to drive the drive belt.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Figure 1:
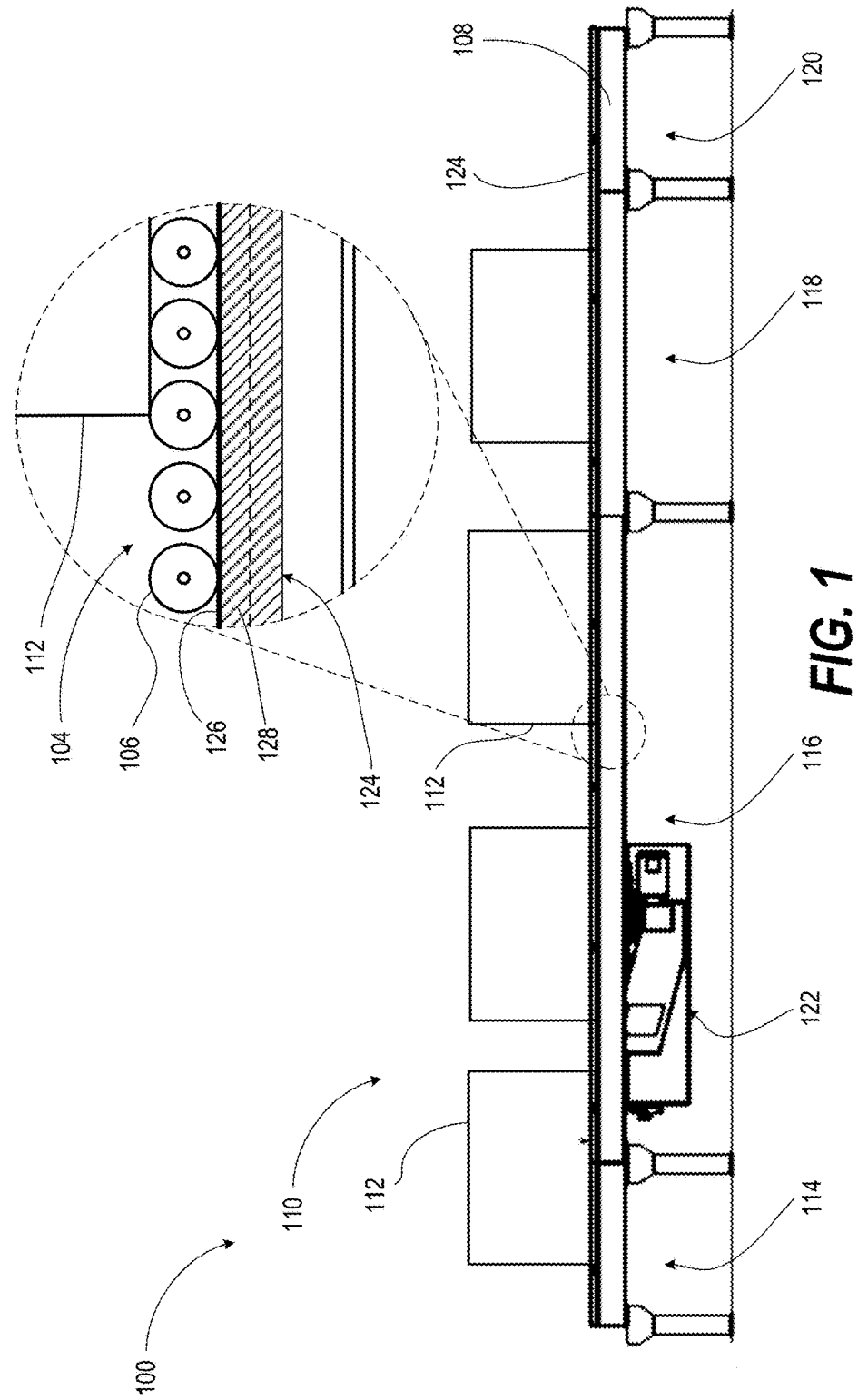
FIG. 1 illustrates a side view of a powered roller conveyor with a longitudinally cutaway detail view of live rollers driven by a having a horizontally-looped drive belt, according to one or more embodiments.

FIG. 1 illustrates a powered roller conveyor 100 that is driven by a longitudinally positioned drive belt 102 according to aspects of the present innovation. A bed 104 of transversely positioned live rollers 106 are axially attached to opposing side rails 108 of a conveyor section 110 to serve as a support surface for conveyed articles 112 such as totes or cartons. In one or more embodiments, the conveyor section 110 includes an infeed idler section 114, a center drive section 116, an intermediate section 118, and a discharge idler section 120. Articles 112 enter the infeed idler section 114 that has an end idler pulley 130 (FIG. 2) for supporting a proximal end of a horizontal loop of the drive belt 102. The center drive section 116 includes a motor, drive pulley and belt tensioner assembly 122. The intermediate section 118 can be the most common conveyor section with multiple intermediate sections 118 supported by the center drive section 116. The articles 112 leave the conveyor section 110 at the discharge idler section 120, which includes an drive pulley 132 (FIG. 2) to support a distal loop of the drive belt 102. A photo-eye guide rail 124 attached above each side rail 108 can provide information as to positions of the conveyed articles 112 such as for controlling zero-pressure accumulation before a merge into a sortation system. A wear indicator layer 126 of an enlarged head portion 128 or bulb contacts an underside of the live rollers 106. The wear indicator layer 126 has a different color than the rest of the drive belt 102 so that excessive wear can be detected prior to any exceedance of service life.

Figure 2:
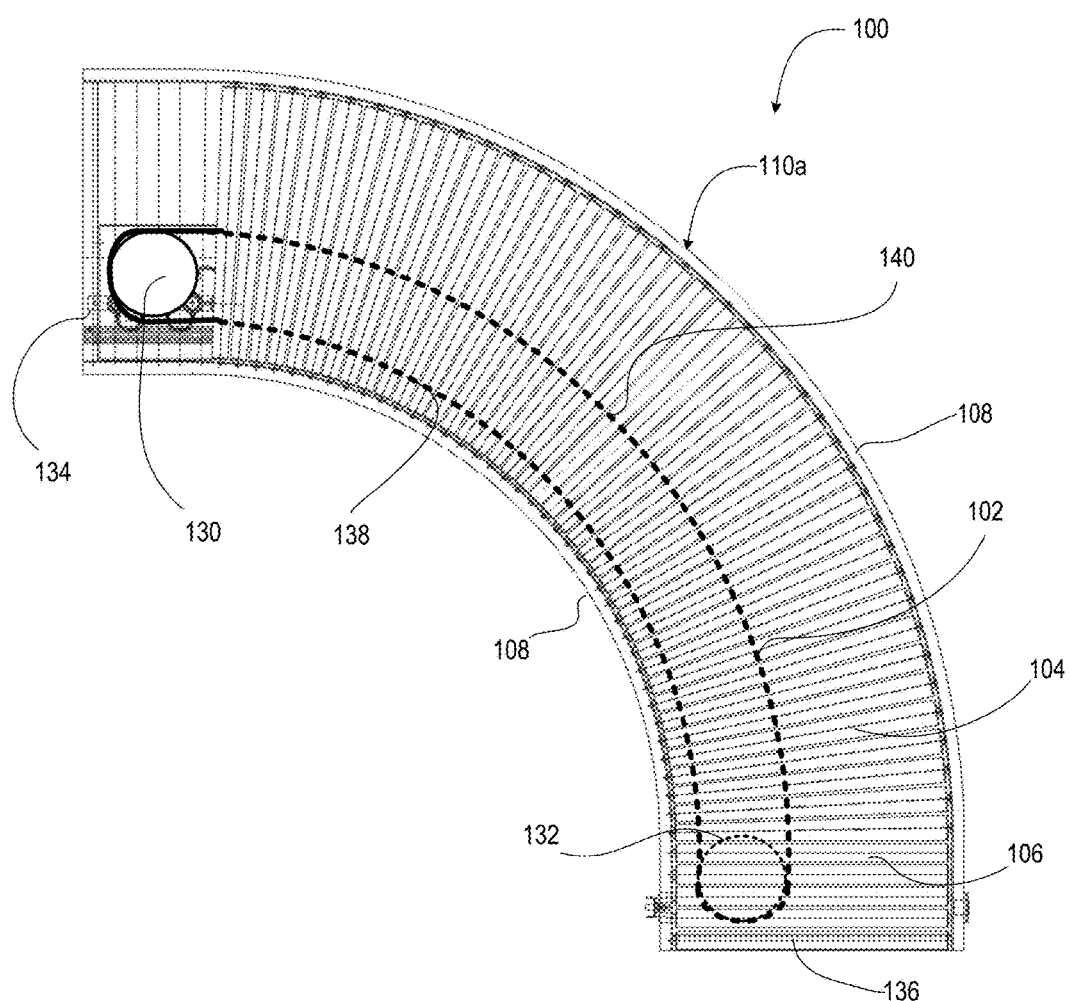
FIG. 2 illustrates a top view of a curved conveyor section of the powered roller conveyor of FIG. 1, according to one or more embodiments.
Figure 3:
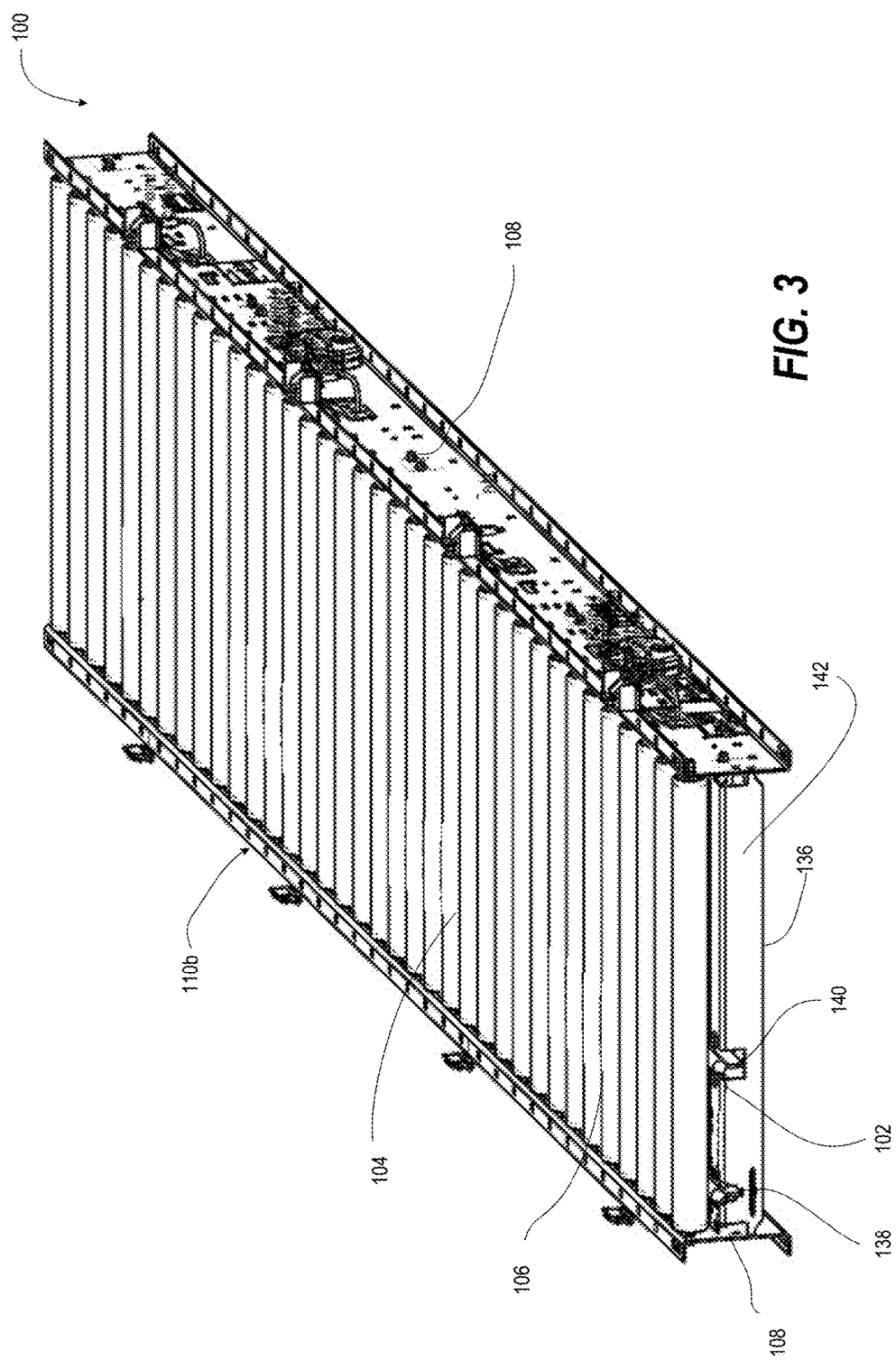
FIG. 3 illustrates an isometric view of a straight conveyor section of the powered roller conveyor of FIG. 1, according to one or more embodiments.
Figure 4:
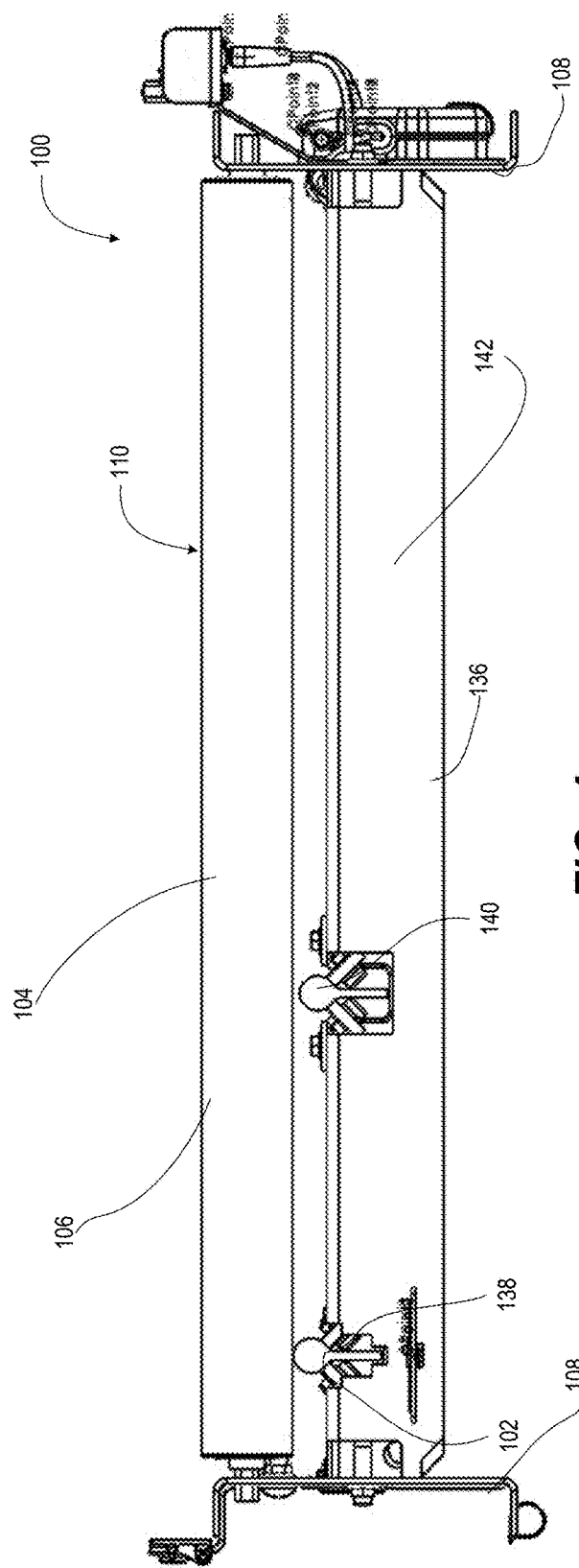
FIG. 4 illustrates a rear view of the powered roller conveyor of FIG. 1 in transverse horizontal cut away exposing the horizontally-looped drive belt, according to one or more embodiments.
Figure 5:
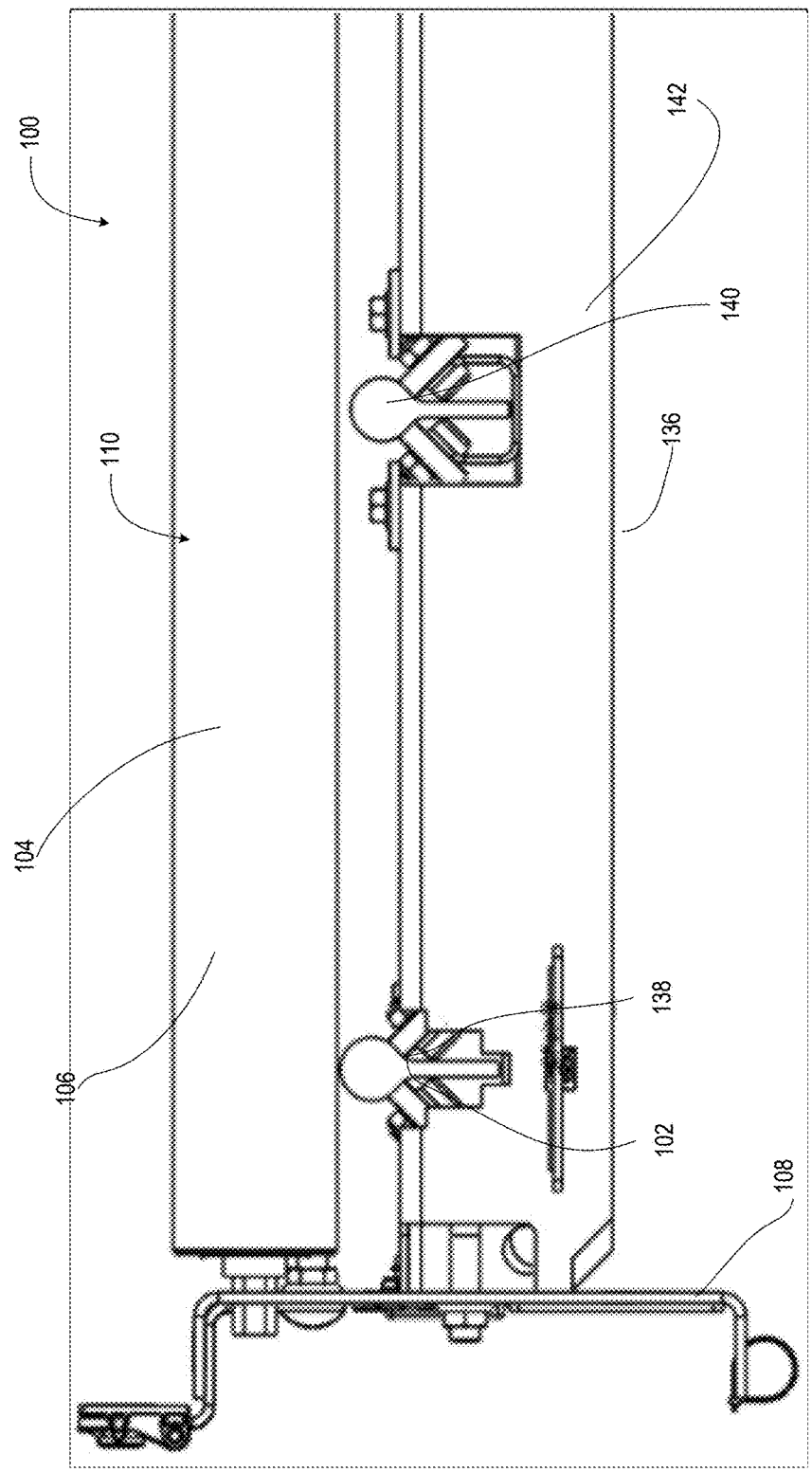
FIG. 5 illustrates a rear detail view of the powered roller conveyor of FIG. 1 in transverse horizontal cut away exposing the horizontally-looped drive belt, according to one or more embodiments.
Figure 6:
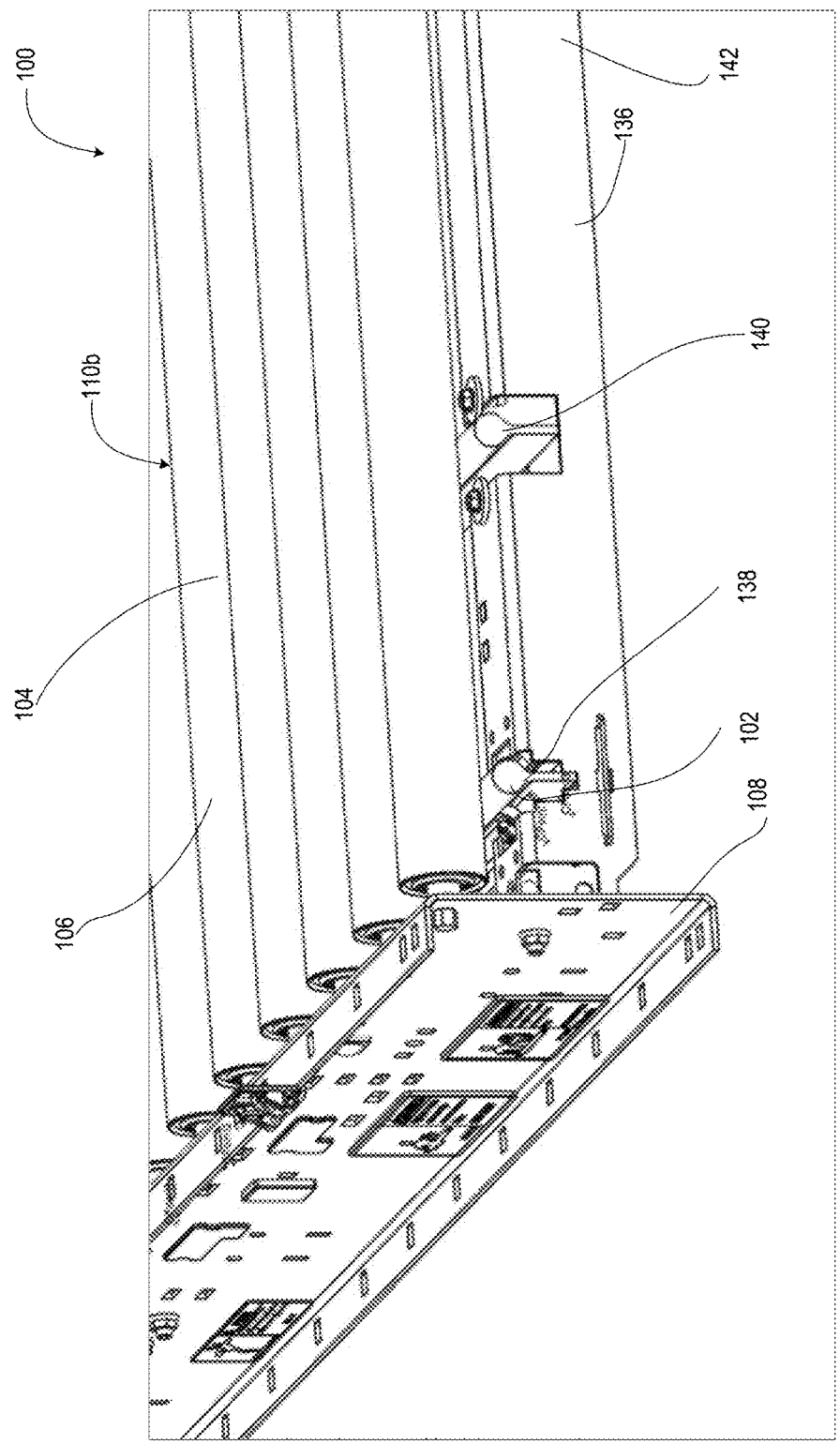
FIG. 6 illustrates a rear isometric detail view of the powered roller conveyor of FIG. 1 in transverse horizontal cutaway exposing the horizontally-looped drive belt, according to one or more embodiments.

FIG. 2 illustrates a curved conveyor section 110a of the powered roller conveyor 100 with a horizontally looped drive belt 102 following a curved path. Since the drive belt 102 as installed is relatively thin laterally with its strength provided by its vertical dimension, the drive belt 102 can be turned horizontally in a relatively small radius. An upstream drive pulley 130 and a downstream end idler pulley 132 both having a vertical axis of rotation attached at respective upstream and downstream ends 134, 136 of the conveyor section 110a. The drive belt 102 that is vertically elongate and is supported for horizontal looping between the upstream drive pulley and downstream end idler pulley 130, 132, presenting drive side 138 and a return side 140.

Figure 7:
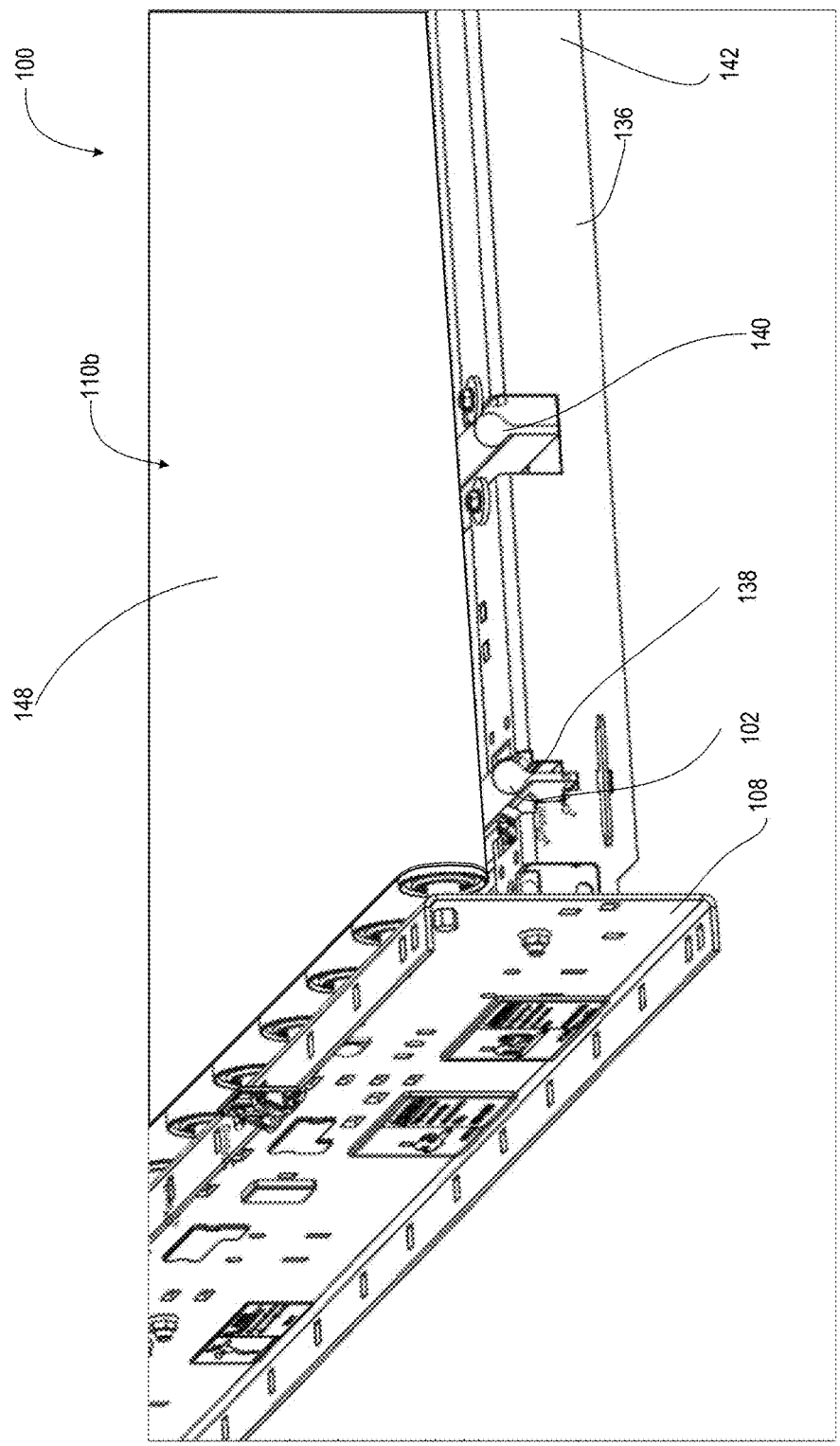
FIG. 7 illustrates a rear isometric detail view of the powered roller conveyor of FIG. 7 with a transfer belt over the live rollers, according to one or more embodiments.

FIGS. 3-6 illustrate a straight conveyor section 110b of the powered roller conveyor 100 showing the drive side 138 and the return side 140 of the cutaway horizontally-looped drive belt 102, supported within transverse frame members 142 attached between the side rails 108. The drive side 138 and a return side 140 are horizontally positioned under the live rollers 106 with the return loop side 146 slight below and out of contact. Accumulator versions of the powered roller conveyor 100 can selectively engage portions of the drive side 138 while allowing other areas to coast to a stop. FIG. 7 illustrates the straight conveyor section 110b of the powered roller conveyor 100 having a transfer belt 148 installed over the live rollers 1006. The drive side 138 is in frictional engagement with the transfer belt 148.

Figure 8:
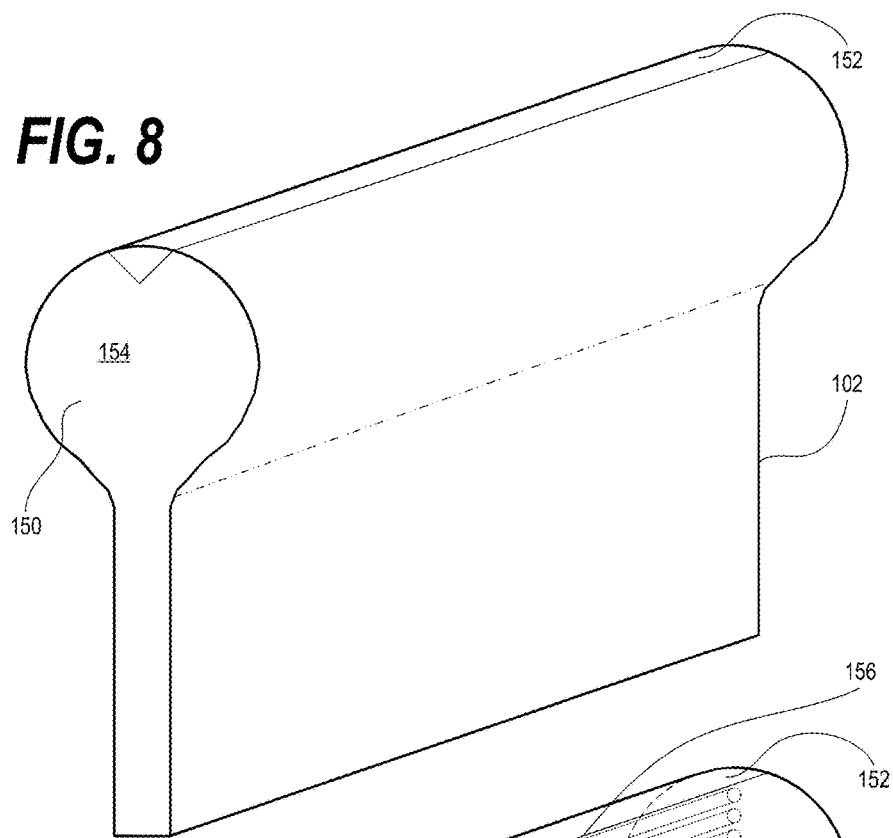
FIG. 8 illustrates an isometric view of a portion of the horizontally-looped drive belt with an enlarged head for increased contact area, according to one or more embodiment.
Figure 9:
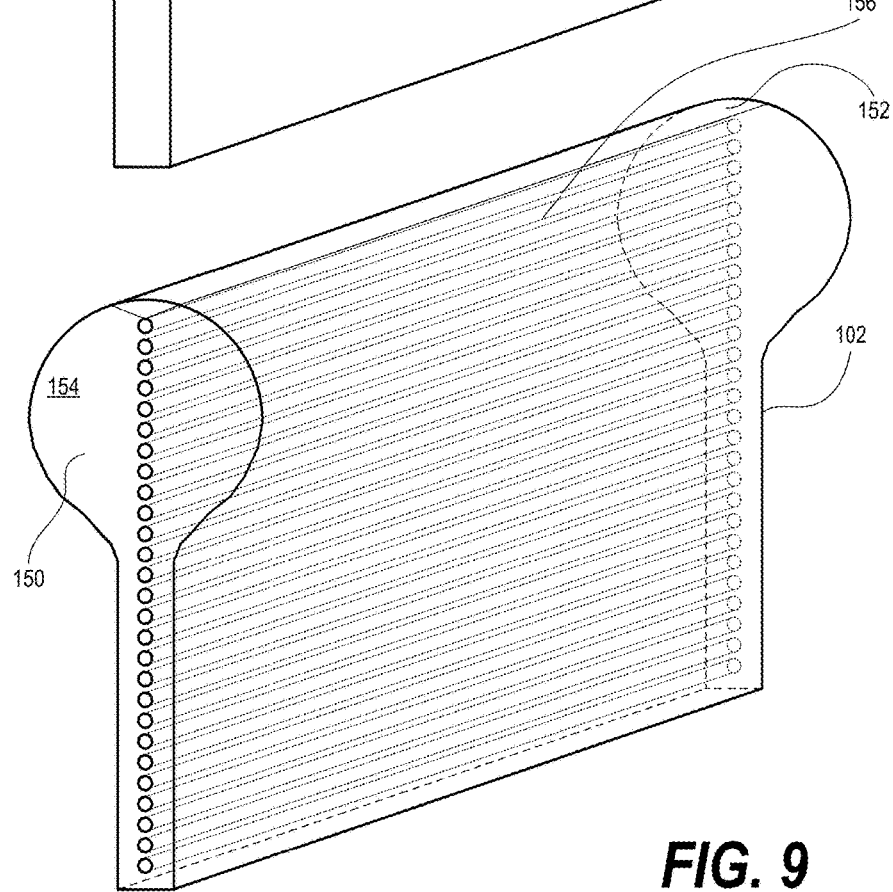
FIG. 9 illustrates an isometric view of a portion of the horizontally-looped drive belt of FIG. 11 with vertically aligned center fibers for strength, according to one or more embodiment.

FIGS. 8-9 illustrate the horizontally-looped drive belt 102 having an enlarged drive head 150 for increased contact surface for driving a series of live rollers 106 (FIG. 1). A wear indicator strip 152 formed in a top edge of the enlarged drive head 150 can provide an indication of a worn condition of the drive belt 102 prior to reaching its service life. In at least one embodiment, FIG. 8 illustrates an elastomeric material 154 of the drive belt 102 for compressing on an inside of a turning radius and expanding on an outside of a turning radius. Vertically aligned center fibers 156 for strength are positioned between the compressing and expanding lateral sides of the drive belt 102.

Figure 10:
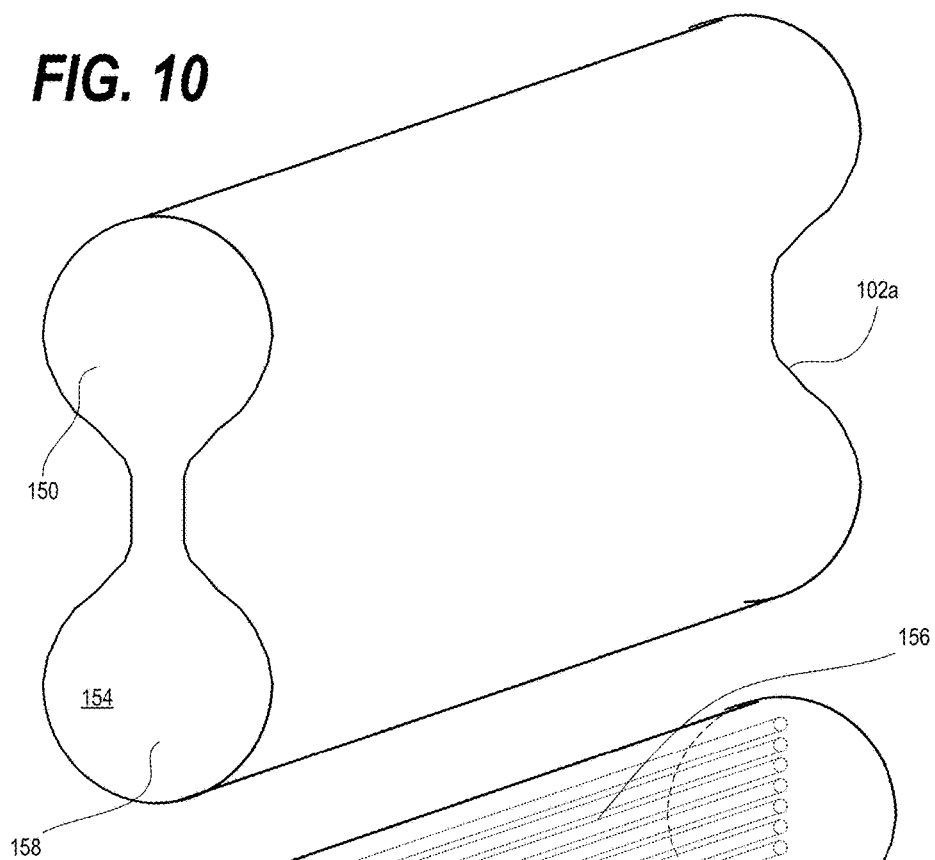
FIG. 10 illustrates an isometric view of a portion of an alternative horizontally-looped drive belt with an enlarged head for increased contact area and a lower enlarged portion for retention, according to one or more embodiment.
Figure 11:
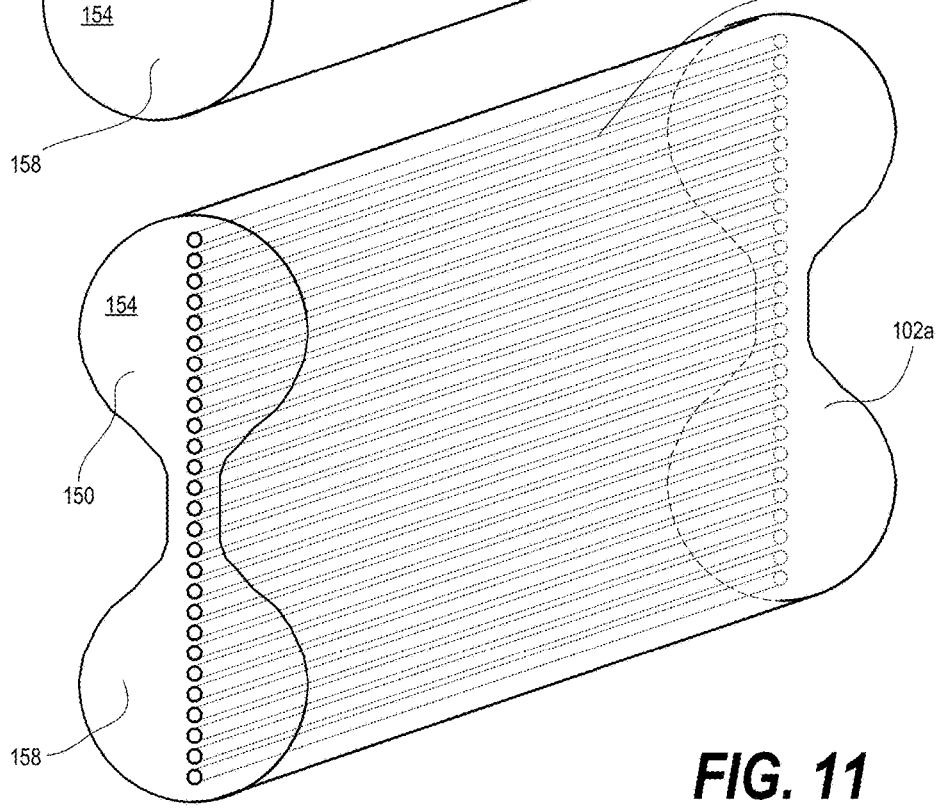
FIG. 11 illustrates an isometric view of a portion of the alternative horizontally-looped drive belt of FIG. 10 with vertically aligned center fibers for strength, according to one or more embodiment.
Figure 12:
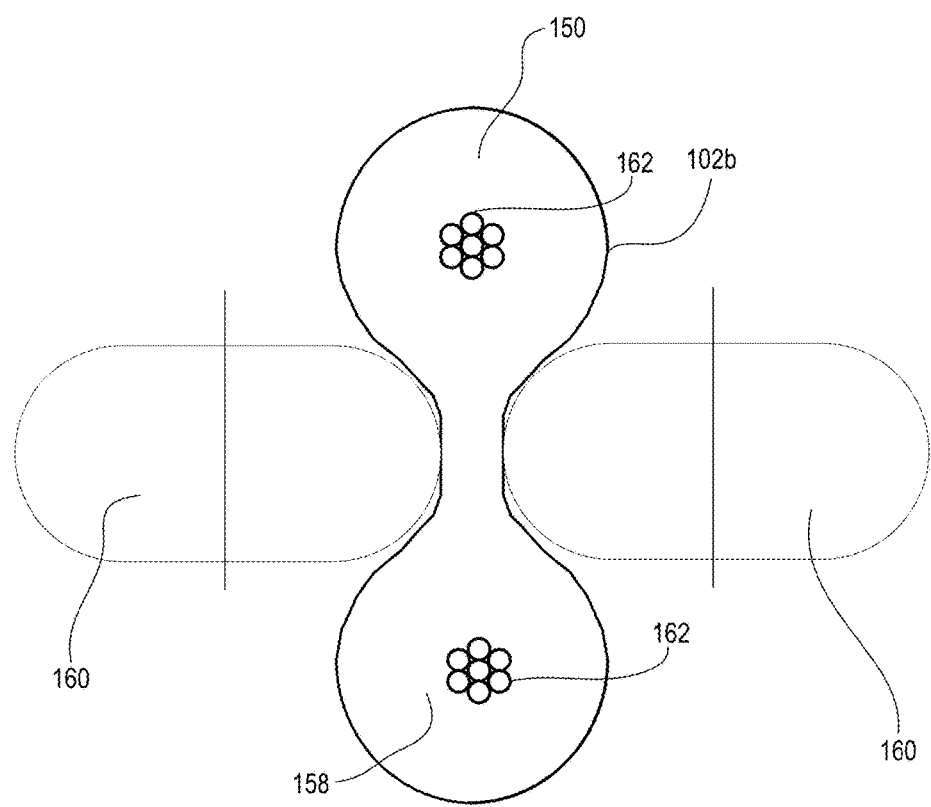
FIG. 12 illustrates a conceptual block diagram in transverse cross section of another alternative horizontally-looped drive belt being vertically positioned for longitudinal movement by a pair of laterally opposing rollers that have vertical axes of rotation, according to one or more embodiments.

FIGS. 10-11 illustrate an alternative horizontally-looped drive belt 102a having an enlarged drive head 150 for increased contact surface for driving a series of live rollers 106 (FIG. 1) as well as a lower enlarged retention head 158. In at least one embodiment, FIG. 11 illustrates an elastomeric material 154 of the drive belt 102a for compressing on an inside of a turning radius and expanding on an outside of a turning radius. Vertically aligned center fibers 156 for strength are positioned between the compressing and expanding lateral sides of the drive belt 102a. FIG. 12 illustrates a further alternative horizontally-looped drive belt 102b being vertically positioned for longitudinal movement by a pair of laterally opposing rollers 160 that have vertical axes of rotation, according to one or more embodiments. Instead of vertically stacked longitudinally projecting fibers, the drive belt 102b includes a bundle of fibers 162 in both the enlarged drive head 150 and a lower retention head 158.

In one or more embodiments, the drive belt 102 can have a tensile pull capabilities of at least 450 lbs and a minimum bend radius of at least ten (10) inches. The elastomeric material 154 can be a thermoplastic or polymeric material such as but not limited to a urethane, and can be an elastomer. An endless drive belt 102 made of thermoplastic urethane may be strong in tension and can be easily manufactured in long lengths. Fibers 156, 162 can be formed from an aramid fiber, such as Kevlar™, but are not limited thereto. Additional materials for the Fibers 156, 162 that serve as bendable tensile members can include, but are not limited to: steel, polyester, Nylon™, Nomex™, Vectran™, or any other suitable cord materials for belting. Fibers 156, 162 can be separate fibers or fibers twisted together, and can be placed within drive belt 102 during the belt forming process. A coating can be applied to provide increase wear resistance and can comprise, but is not limited to, a layer of woven nylon fabric. Coating can be between about 0.001-0.20 inches thick, such as about 0.005 inches thick. In one or more embodiments, the elastomeric material 154 can be formed from thermoplastic urethane with a durometer of between about 76 and about 95 on the Shore A scale. For instance, elastomeric material 154 can have a durometer of about 85 on the Shore A Scale, but is not limited thereto. Durometer is a measure of "hardness" of an elastomeric material, and can be measured by a Shore A test instrument that applies an impact force to the urethane material, and measures the hardness of the urethane as an indentation depth resulting from that force. The 85 Shore A urethane material used in the drive belt 102 can be stiff, and can fall between a "hard" value of 70 Shore A described as a shoe heel, and an "extra hard" value of 90 Shore A described as a golf ball. This range information can be found at "http://www.casterland.com/info-durometer.htm".

Figure 13:
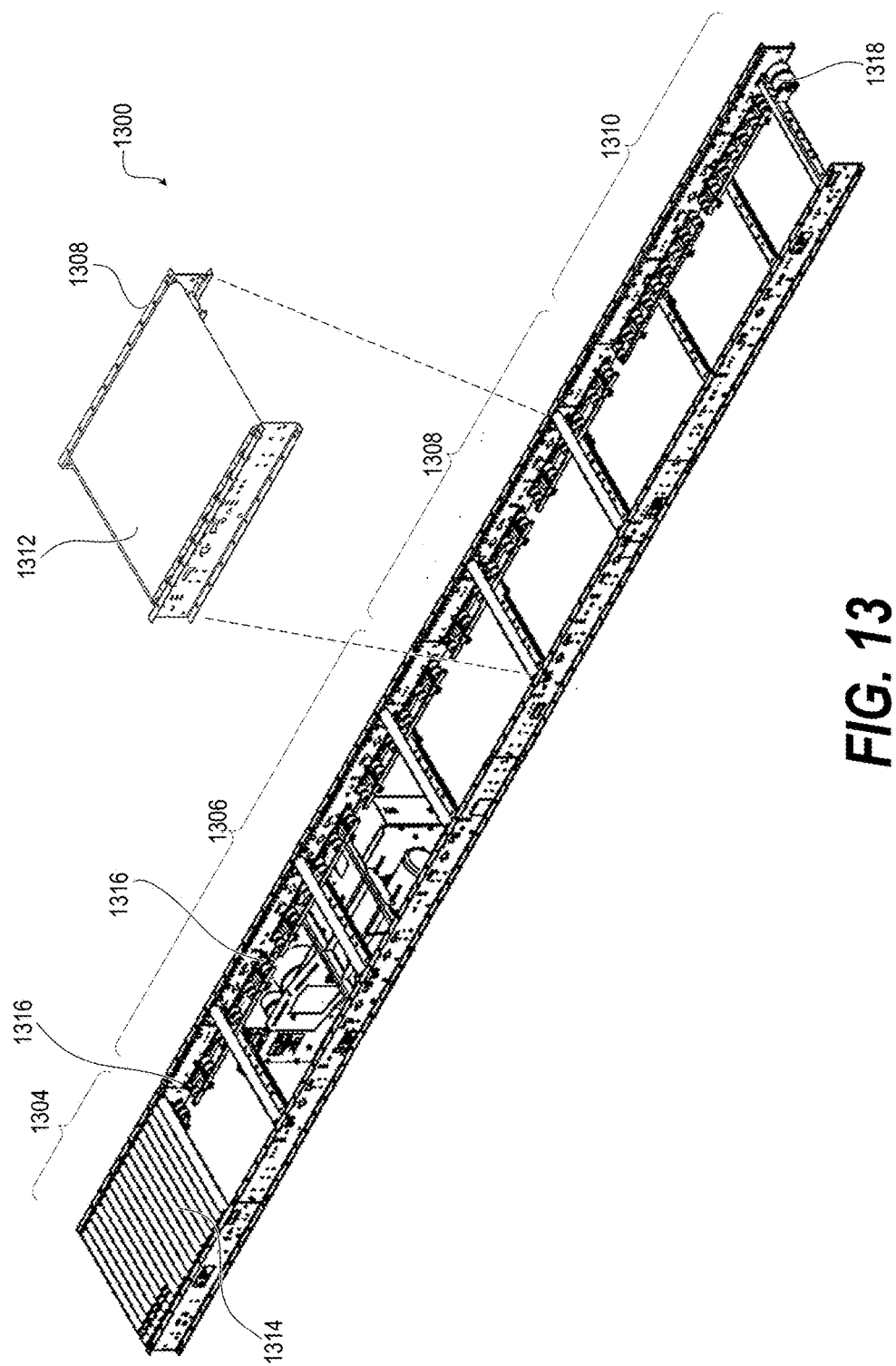
FIG. 13 illustrates an isometric disassembled view of an example accumulation conveyor having a side-mounted horizontally-oriented drive belt and having a section with a full-width transfer belt, according to one or more embodiments.
Figure 14:
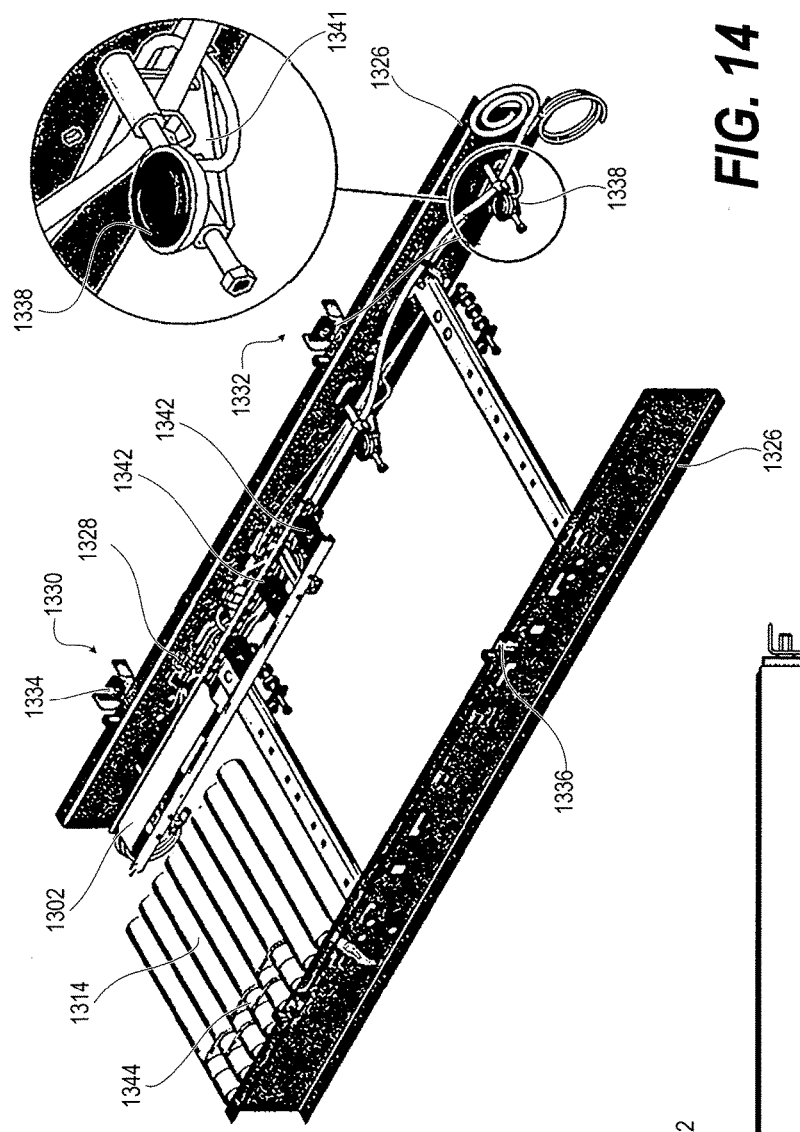
FIG. 14 illustrates an isometric view of a conveyor section of FIG. 12, according to one or more embodiments.
Figure 15:
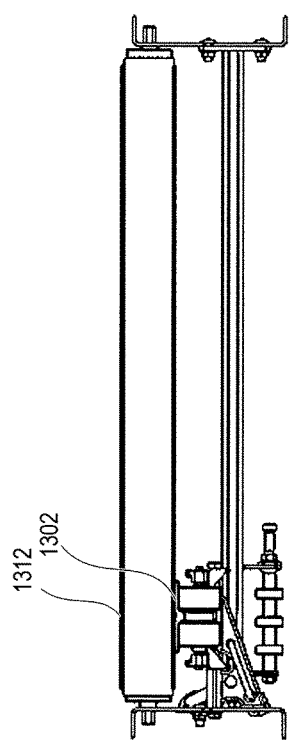
FIG. 15 illustrates a rear cutaway view of the example accumulation conveyor of FIG. 13, according to one or more embodiments.

FIGS. 13-15 illustrate a conveyor system 1300 that has a horizontally oriented V-backed drive belt 1302 (FIG. 14) that is vertically looped. FIG. 13 illustrates that the conveyor system 1300 typically contains an infeed idler section 1304, a center drive section 1306, an intermediate section 1308, and a discharge idler section 1310. Each section 1304, 1306, 1308, 1310 can include a transfer belt 1312 over carrier (live) rollers 1314 to enhance movement of small and light product such as polybags. Product (not shown) enters the conveyor system 1300 on the infeed idler section 1304 which contains one pressure shoe assembly 1316 and an end idler pulley 1318. The V-backed drive belt 1302 wraps around the end idler pulley 1318. The center drive section 1306 is the first or second section after the infeed idler section 1304 and can be pre-assembled to an intermediate section 1308. The center drive section 1306 contains a motor, a drive pulley, and a pneumatic belt tensioner (not shown). Intermediate sections 1308 are typically the most common conveyor section, making up long lengths of conveyor between the infeed and discharge end idler sections 1304, 1310. Product entering the conveyor system 1300 should already be aligned to one edge. Typically, this alignment is created by hard-skewed rollers in an upstream V-belt conveyor (not shown). Product leaves the conveyor system 1300 from the discharge idler section 1310. The discharge idler section 1310 contains two pressure shoe assemblies 1316 and the end idler pulley 1318. The discharge idler section 1310 is supplied with a separate solenoid-controlled valve (not shown) that controls the release of the discharge idler section 1310.

FIG. 14 illustrates that the intermediate sections 1308 include frames 1326, carrier (live) rollers 1314, a zone control ZoneFlex module 1328, and necessary components to support the drive belt 1302 and general operation. Three-foot-long zones 1330, 1332 can be used for controlling the product flow. Each zone 1330, 1332 has a photo-eye 1334, reflector 1336, vertical actuators illustrated as air diaphragms 1338, and shares a ZoneFlex Module 1328. A light beam travels across the intermediate section 1308 from the photo-eye 1334 to the reflector 1336 and back to the photo-eye 1334. When product blocks the light beam, the photo-eye 1334 sends a signal to the ZoneFlex Module 1328, which inflates or deflates the air diaphragm 1338. When the air diaphragms 1338 are inflated, the air diaphragms 1338 mounted on a pressure shoe support 1341 raise the pressure shoe assembly 1316 including pressure rollers 1342 that frictionally engage the V-backed drive belt 1302 up against the bottom of the transfer belt 1312. Thereby, the transfer belt 1312 for that zone 1330, 1332 discontinues coasting and is longitudinally moved at the speed of the drive belt 1302. Some upstream live rollers 1314 are connected by power transfer bands 1344 to move with downstream roller that makes effective frictional engagement to the drive belt 1302. FIG. 15 illustrates the offset contact between V-backed drive belt 1302 and the transfer belt 1312.

Figure 16:
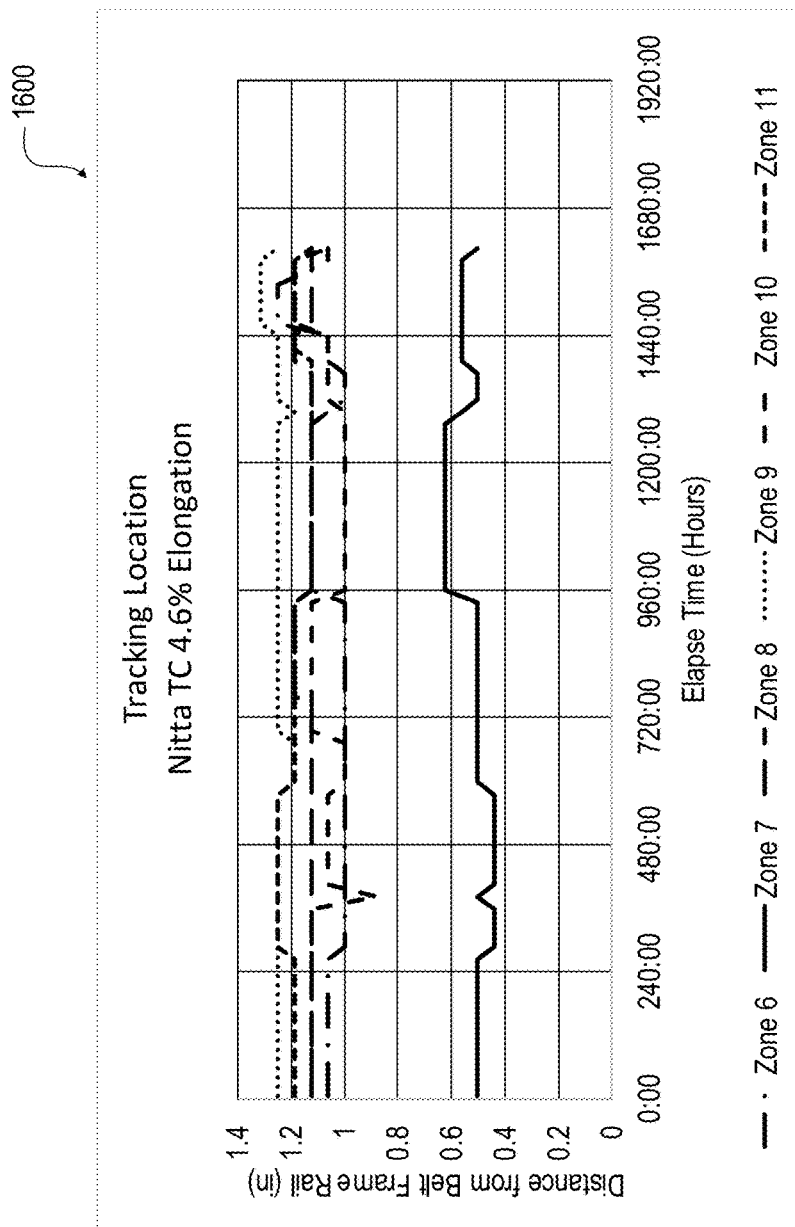
FIG. 16 illustrates a graphical plot of test results for tracking location of a transfer belt installed on a INTELLIQ accumulation conveyor.
Figure 17:
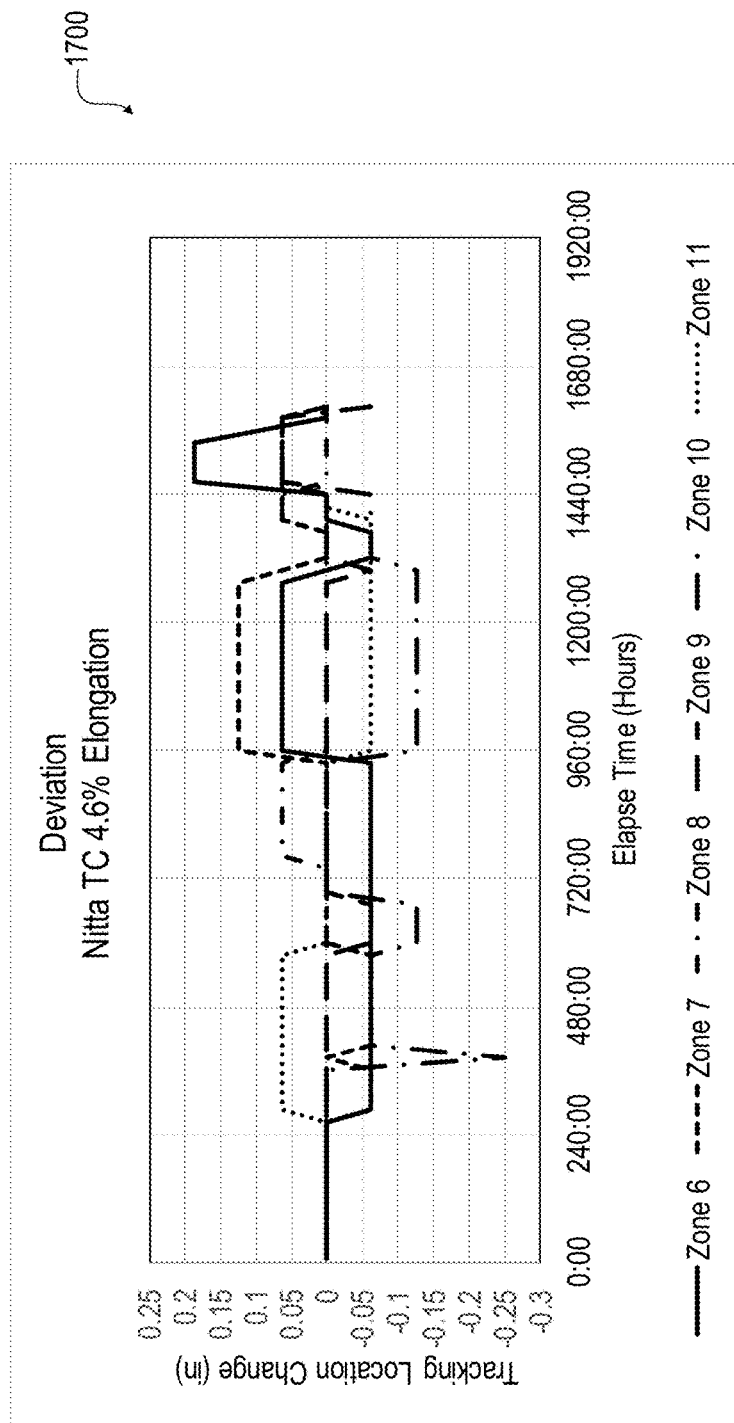
FIG. 17 illustrates a graphical plot of test results for deviation of the transfer belt installed on the INTELLIQ accumulation conveyor.
Figure 18:
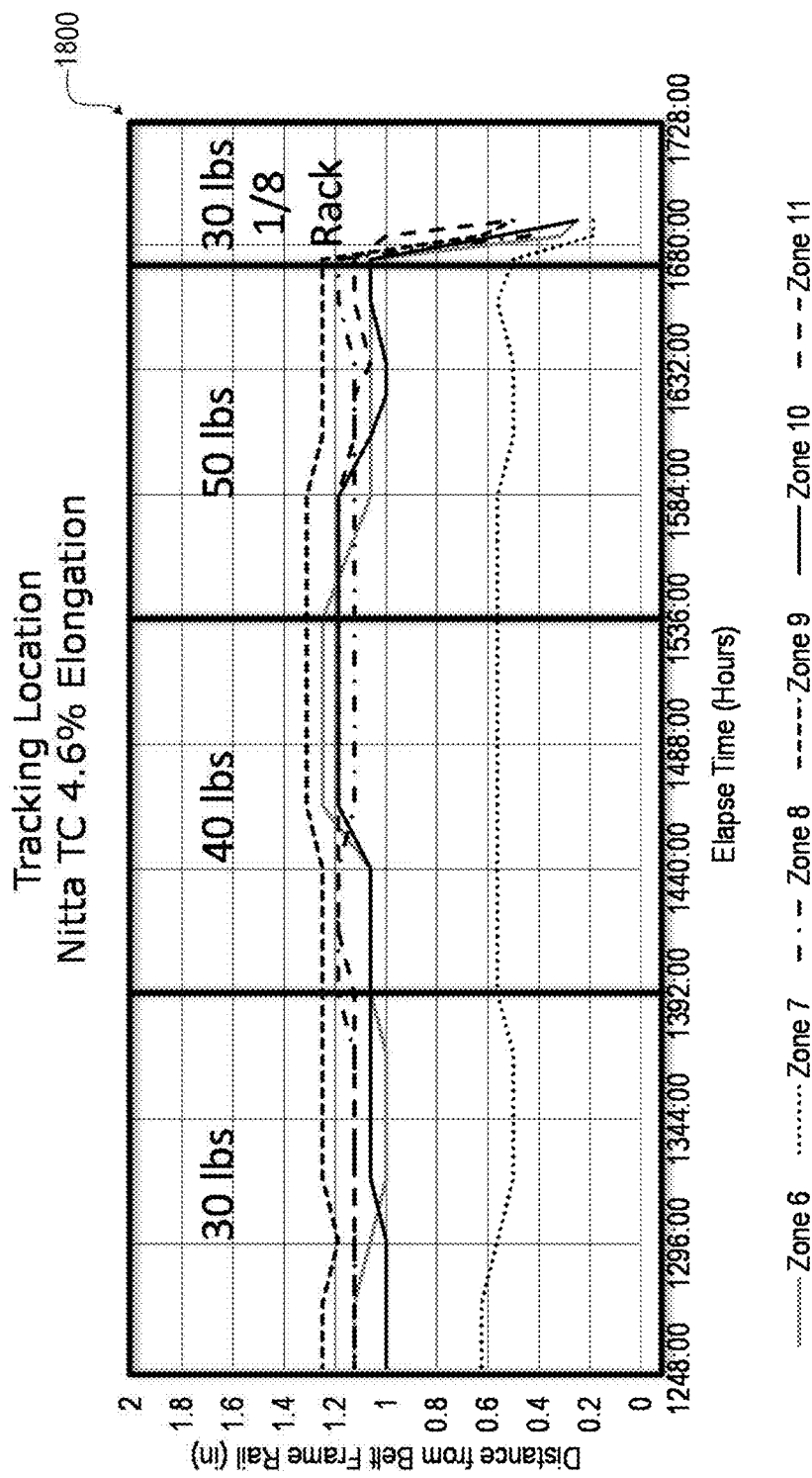

The driving contact between the drive belt 1302 and the transfer belt 1312 is off center and a prototype testing configuration did not include mechanisms to maintain tracking of the transfer belt 1312. However, extended testing has shown that the transfer belt 1312 wears in a uniform manner and maintains tracking. FIG. 16 illustrates a graphical plot 1600 of test results for tracking location of a transfer belt installed on a INTELLIQ accumulation conveyor. FIG. 17 illustrates a graphical plot 1700 of test results for deviation of the transfer belt installed on the INTELLIQ accumulation conveyor. FIG. 18 illustrates a graphical plot 1800 for tracking location.

Testing on two belts was performed to determine whether a transfer belt could be driven by a side mounted narrow drive belt without tracking or uneven wear problem. In particular, the selected transfer belt tested was POLYSPRINT TC PS-06 available from NITTA CORPORATION:

(a) Construction: (1) TPU (Taffeta surface, Green) and (2) Conductive TPU (Textured surface, Black), antistatic;

(b) Available Width: 10 to 450 mm; Available Length: 400 to 100,000 mm; Thickness: 1.4 mm; Joint: Finger Joint (standard dimension: 10 W*30 L) & Skiver Joint;

(c) Tensile strength: 30 N/mm, Elongation at break: 500%, test speed 50 mm/min, ambient condition 23° C., 50% humidity;

(d) Standard elongation: 5%;

(e) Tension at 5%: 0.8 N/mm after 200 hours running-in, ambient condition 23° C., 50% humidity;

(e) Minimum pulley dia. φ40 mm (f) Temperature range: −20 to +60° C.;

(g) Coefficient of friction: 0.6 to 0.7 (Paper)/0.3 to 0.4 (Steel) Green side; 0.6 to 0.7 (Paper)/0.3 to 0.4 (Steel) Black side, Measuring condition: 7 kPA*1 mm/s, ambient condition 23° C., 50% humidity;

(h) Mass 1.5 kg/m2

The specific design and testing parameters for the tested transfer belt were as follows:

Belt type TC, Belt width 838 mm, Belt length 1165 mm, Elongation ε 4.6%;

Belt Speed V 61.0 m/min;

Total Mass of Conveying Goods 91 kg;

Total Mass of Conveying Goods $W_G$ 889 N;

Total Mass of Belt $W_B$ 15.088 N;

TC Unit mass 1.5 kg/m$^2$

Carrier Roller Mass WC 400 N Estimation;

Angle of Contact (AOC) on the Drive Pulley θ 180°;

Coefficient of Friction (COF) (between Belt and Plate) μa 0.40;

COF (between Belt and Drive pulley) μ0.2;

Coefficient by the Drive Pulley Position $C_1$ 0.0;

Startup time t 0.5 s;

Acceleration α 2.0 m/s$^2$, α=V/(60×t);

Conveyor inclination angle θ 0.0°;

Service Factor (SF) $C_2$ 1.5;

Standard Elongation $ε_0$ 5.0%;

Tension at $ε_0$% To 0.8 N/mm;

Installation parameters were determined as follows:

Effective Tension Te 249 N, Formulation Te=($W_G$+$W_B$+$W_C$)/20+$W_G$ sin θ+($M_G$+$M_B$)×α;

Tension×2 To 1228 N, Formulation 2To=Te×(K+C1)×C2

K={EXP(μ×θ)+1}/{EXP(μ×θ)−1};

Elongation ε [%]4.58, Formulation ε=(Fa×ε0)/(W×2×f);

Calculated Motor Power P 253 W, Formulation P=(Te×V)/60.

Test setup was designed to test a worst case scenario:

24" zones;

34" Width;

180 FPM;

Heavy duty (HD) drive belt;

Accumulation logic (cycling of drive belt on zone belt);
Two continuously running zones;

Variables included testing two belt manufacturers with product weight increasing as test progressed. Frame rack pushed frame out of square to test effects. Test results indicate that the zone transfer belts for both manufacturers held up better than expected to belt-on-belt contact. IntelliQ HD Drive Belt was observed to have minimum wear with only slight darkening of drive surface. Belt tracking, belt wear, drive torque and accumulation logic were all proved out through the test results for use without product, with light product, and with heavy product.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A conveyor section comprising:
   a pair of spaced, opposing side rails;
   vertical frame members attached transversely between the pair of opposing side rails;
   more than one live roller transversely attached for rotation between the opposing side rails providing a conveying surface for articles;
   an upstream pulley and a downstream pulley both having a vertical axis of rotation attached at respective upstream and downstream ends of the conveyor section;
   a drive belt comprising a vertically elongated portion and an upper enlarged head portion and a lower enlarged retaining portion, wherein the drive belt is supported for horizontal looping between the upstream and downstream pulleys and supported by the vertical frame members and having a drive loop side and a return loop side that are horizontally positioned under the more than one live roller with the drive loop side engageable to an undersurface of the live rollers; and
   a drive motor operatively coupled to drive the drive belt.

2. The conveyor section of claim 1, wherein the upper enlarged head further comprises a wear indicator strip having a different color than an adjacent portion of the upper enlarged head portion.

3. The conveyor section of claim 1, wherein he drive belt further comprises a bundle of longitudinal fibers embedded in the lower enlarged retaining portion of an elastomeric material.

4. The conveyor section of claim 1, wherein the drive belt further comprises vertically aligned stack of strands of longitudinal fibers embedded in an elastomeric material.

5. The conveyor section of claim 1, wherein the drive belt further comprises a bundle of longitudinal fibers embedded in the upper enlarged head portion of an elastomeric material.

6. The conveyor section of claim 1, wherein the conveyor section is curved.

7. The conveyor section of claim 1, further comprising a vertical actuator positioned under the drive belt to selectively raise the drive belt into frictional engagement with the at least one of the more than one live roller.

8. An accumulator conveyor section comprising:
   a pair of spaced, opposing side rails;
   vertical frame members attached transversely between the pair of opposing side rails;
   two or more accumulation zones each comprising:
      live rollers transversely attached for rotation between the opposing side rails; and
      an elastomeric transfer belt received over a full lateral width of the live rollers providing a conveying surface for articles;
   a drive belt that is proximal and mounted to one side rail in driving frictional contact with an underside of the elastomeric transfer belt;
   a vertical actuator positioned under the drive belt to selectively raise the drive belt into frictional engagement with the transfer belt of a selected one of the two or more accumulation zones; and
   a drive motor operatively coupled to drive the drive belt.

9. The conveyor section of claim 8, further comprising an upstream end idler pulley and a downstream end idler pulley both having a vertical axis of rotation attached at respective upstream and downstream ends of the conveyor section, wherein the drive belt is vertically elongate and supported for horizontal looping between the upstream and downstream end idler pulleys and supported by the vertical frame members and having a drive loop side and a return loop side that are horizontally positioned under the live rollers.

10. The conveyor section of claim 9, wherein the drive belt comprises an upper enlarged head portion.

11. A conveyor section comprising:
   a pair of spaced, opposing side rails;
   vertical frame members attached transversely between the pair of opposing side rails;
   more than one live roller transversely attached for rotation between the opposing side rails providing a conveying surface for articles;

an upstream end idler and a downstream end idler both having a vertical axis of rotation attached at respective upstream and downstream ends of the conveyor section;

a drive belt that is vertically elongate and supported for horizontal looping between the upstream and downstream end idlers and supported by the vertical frame members and having a drive loop side and a return loop side that are horizontally positioned under the more than one live roller with the drive loop side engageable to an undersurface of the live rollers, wherein the drive belt comprises a lower enlarged retaining portion; and a drive motor operatively coupled to drive the drive belt.

12. The conveyor section of claim 11, wherein the drive belt further comprises a bundle of longitudinal fibers embedded in the lower enlarged retaining portion of an elastomeric material.

13. The conveyor section of claim 11, wherein the drive belt further comprises vertically aligned stack of strands of longitudinal fibers embedded in an elastomeric material.

14. The conveyor section of claim 11, wherein the conveyor section is curved.

15. The conveyor section of claim 11, further comprising a vertical actuator positioned under the drive belt to selectively raise the drive belt into frictional engagement with the at least one of the more than one live roller.

* * * * *